(12) United States Patent
Macdonald et al.

(10) Patent No.: US 9,014,678 B2
(45) Date of Patent: Apr. 21, 2015

(54) PREVENTING GENERATION OF SPURIOUS SIGNALS DURING TRANSMISSION

(75) Inventors: Andrew J. Macdonald, Grosse Pointe Park, MI (US); Sethu K. Madhavan, Canton, MI (US); Claude Jinga, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 21 days.

(21) Appl. No.: 13/526,167

(22) Filed: Jun. 18, 2012

(65) Prior Publication Data

US 2013/0337782 A1    Dec. 19, 2013

(51) Int. Cl.
*H04M 3/00* (2006.01)
*H04B 3/23* (2006.01)

(52) U.S. Cl.
CPC .............. *H04M 3/002* (2013.01); *H04B 3/232* (2013.01)

(58) Field of Classification Search
CPC ....... H04M 3/002; H04L 27/12; H04L 27/10; H04W 52/00; H04W 4/22; H04W 4/00; H03K 7/06

USPC .......... 455/68, 414, 414.1, 404.1, 556.1, 557; 370/203; 375/283, 295, 303, 308; 379/93.01, 93.09, 93.28, 93.37
See application file for complete search history.

(56) References Cited

U.S. PATENT DOCUMENTS

| | | | |
|---|---|---|---|
| 2005/0207511 A1* | 9/2005 | Madhavan et al. | 375/303 |
| 2007/0092024 A1* | 4/2007 | Madhavan et al. | 375/283 |
| 2010/0232414 A1* | 9/2010 | Jeon | 370/347 |

* cited by examiner

*Primary Examiner* — Kashif Siddiqui
(74) *Attorney, Agent, or Firm* — Anthony Luke Simon; Reising Ethington P.C.

(57) ABSTRACT

A system and method for data communication over a cellular communications network that allows the transmission of digital data over a voice channel connection using a vocoder that prevents the generation of spurious signals during transmission. The method utilizes a signaling waveform which varies in amplitude, frequency, phase, or combination thereof without exhibiting periodic nullities.

13 Claims, 3 Drawing Sheets

PREVENTING GENERATION OF SPURIOUS SIGNALS DURING TRANSMISSION

TECHNICAL FIELD

The present invention relates generally to wireless communication and, more particularly, to systems and techniques for establishing data communications over a voice channel of a wireless communication system.

BACKGROUND OF THE INVENTION

As the number of telematics-equipped vehicles continues to increase, so does the utilization of wireless communication systems to provide telematics services to and from those vehicles. The telecommunications industry continues to focus on providing new and enhanced services to cellular customers. Today's telematics services include the capability of receiving data over a voice channel during the same call used for conversation between cellular customers or between a cellular customer and a live advisor at a call center or other remote facility. In order to establish this data connection, an electronic 'handshake' occurs between each party's wireless modem. This handshake is transparent to the cellular customer or the live advisor. However, during the course of establishing the data connection, spurious signals can be generated. These spurious signals can cause an echo phenomenon during voice transmission. This echo phenomenon is well-known to those acquainted with cellular phones. A caller and/or recipient of the call hears an echo (an artifact or segment of his/her own speech) back to him/her immediately following his/her utterance. These echoes may or may not be perceived by the other person on the other end of the transmission. In addition, data link failures can occur due to echo wherein the sending and receiving modems may entirely fail to communicate. The echoing effect during transmission causes miscommunication wherein the sending wireless modem may not recognize the receiving wireless modem or may believe it to be a different model. In either scenario, the entire data linkage may fail.

SUMMARY OF THE INVENTION

According to one embodiment of the invention, there is provided a method of establishing a data connection over a voice channel via a cellular communication network, comprising the steps of: establishing a voice channel connection over a wireless carrier system; and creating a data connection over the established voice channel connection using the step of transmitting a signaling waveform over the voice channel between a first wireless modem and a second wireless modem, wherein the signaling waveform varies in amplitude, frequency, phase, or any combination thereof and wherein the signaling waveform does not exhibit periodic nullities.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and method described below is directed to minimizing data link failures using special signaling waveforms (i.e., waveforms not used for voice conversations) which are sent between wireless modems.

Communications System—

Figure 1:
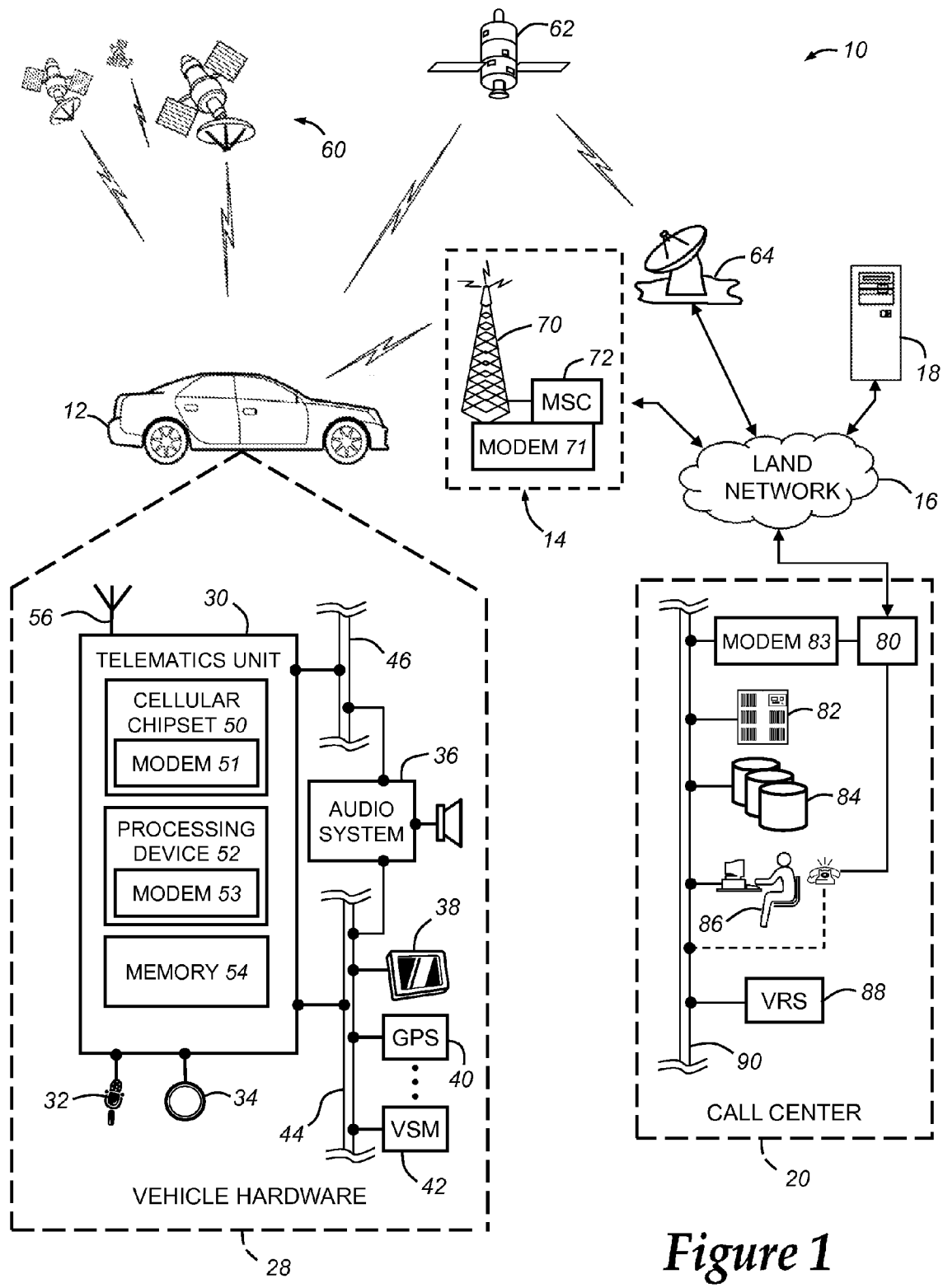
FIG. 1 is a block diagram depicting an exemplary embodiment of a communications system that is capable of utilizing the methods disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1; these include a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards. The telematics unit 30 comprises a cellular chipset 50 (including both a vocoder and a network modem 51 for voice communications like hands-free calling); an electronic processing device 52 (which comprises a wireless modem 53 for data transmission); one or more digital memory devices 54; and a dual antenna 56. A network modem 51 contained in the chipset 50 is used to communicate with the base station of the wireless network 14 using a specific protocol (e.g., according to CDMA or GSM standards), and thus is considered to be a part of the network equipment used in implementing wireless network 14. The wireless modem 53 is used to convert digital data into a signal in the voice frequency range supported by the voice channel (typically less than 3400 Hz). It should be appreciated that the wireless modem 53 can either be implemented through software that is stored in the telematics unit and is executed by processor 52, or it can be a separate hardware component located internal or external to telematics unit 30. The wireless modem 53 can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Vehicle services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed vehicle services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Also, either the base station or MSC 72 may include a network modem 71. This network modem 71 functions similarly to network modem 51 such that these modems communicate with each other within the wireless carrier system 14, as is known. Thus for example, data sent from vehicle 12 via modem 51 is demodulated by the network modem 71 located at the base station or located at MSC 72 before being sent to the call center 20 via the land network 16. Similarly, data that is sent from the call center 20 via the land network 16 is modulated by the network modem 71 at the base station or located at the MSC 72 prior to transmission over the wireless carrier system 14. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a wireless modem 83 connected between the switch 80 and network 90. Data transmissions are passed via the wireless modem 83 to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Where voice communication is desired between the vehicle 12 and call center 20, an occupant in the vehicle 12 speaks into the microphone 32 and the speech is digitized (i.e., analog to digital conversion). Following digitization, the vocoder of the cellular chipset 50 compresses/encodes the speech. After the encoded speech is modulated by the network modem 51, it may be transmitted via antenna 56 across the wireless carrier system 14. Upon reaching the cell tower 70, it is demodulated by another network modem and decompressed/decoded by another vocoder per standard cellular system operation, and ultimately reaches the call center 20 via the telephone land lines 16. Where voice communication is desired from the call center to the vehicle, it is to be understood that this process is simply reversed.

Where data communication is desired from the vehicle 12 to the call center 20, data is first modulated/encoded onto a carrier signal by wireless modem 53. The resulting signal is representative of a signal in the voice frequency range (typically less than 3400 Hz). This resulting signal is then sent to the cellular chipset 50 and compressed/encoded by its vocoder and further modulated by the network modem 51. Because of the signal's characteristics, the vocoder does not reject it as non-speech; and thus allows for higher rate transmission. These characteristics are discussed below. The resulting signal is therefore sent via the voice channel (just as the previously described voice communication). The data communication follows the same path as the voice communication described above and reaches the wireless modem 83 at the call center 20 where it is demodulated/decoded. As described above, where data communication is desired from the call center to the vehicle, it is to be understood that this process is simply reversed.

Figure 2:
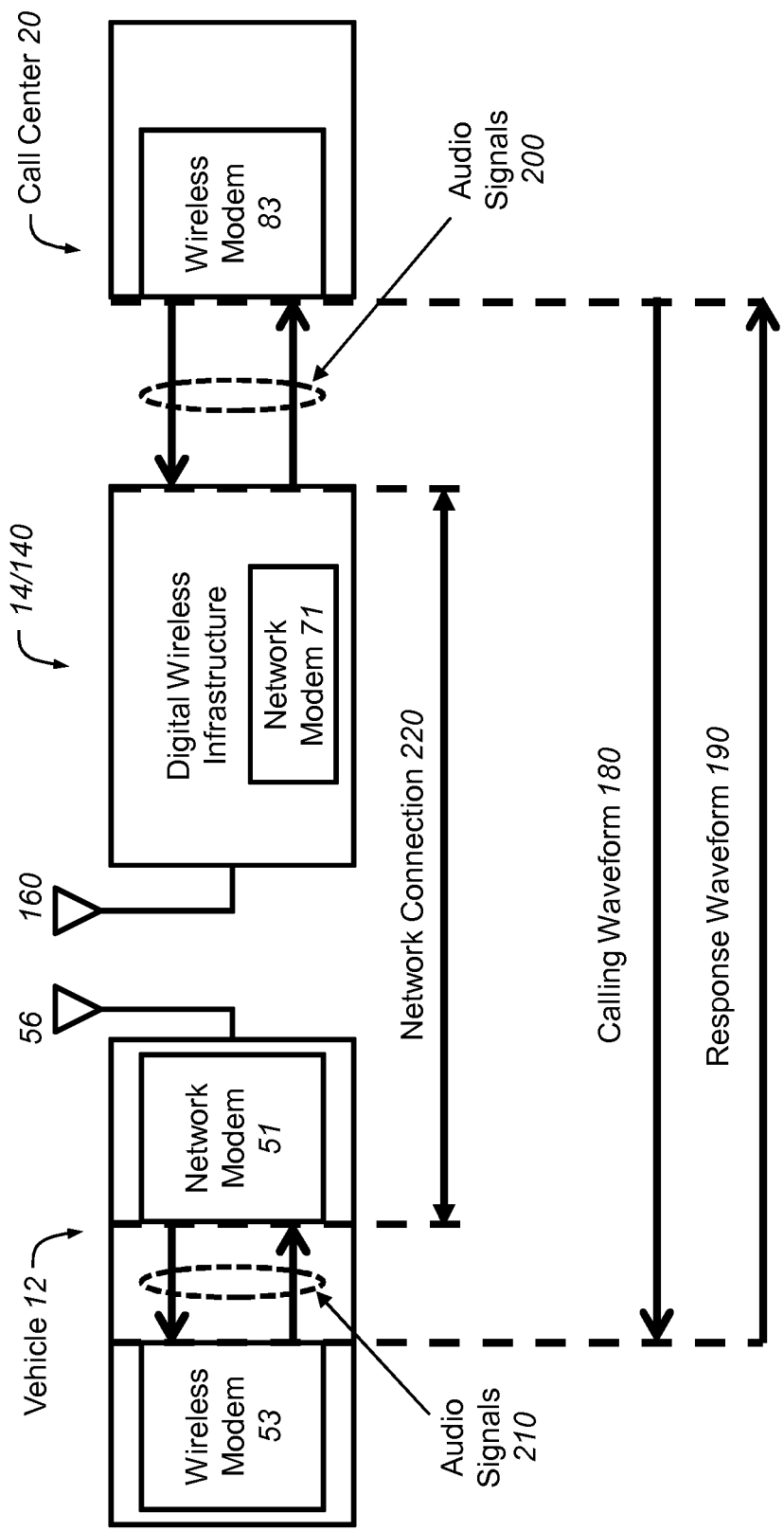
FIG. 2 is a diagram depicting some of the hardware elements from FIG. 1 that are used in establishing a voice channel connection and a data connection over the voice channel.

FIG. 2 illustrates the path of a data communication via a voice channel connection between the vehicle 12 and the call center 20. Both the wireless modem 53 and network modem 51 are shown as components within the vehicle 12; and the call center 20 comprises the wireless modem 83. The digital wireless infrastructure 140 comprises the wireless communication system 14, including an antenna 160 on the base station 70, as well as the network modem that is located at the base station/MSC.

Once the voice channel connection is established between the wireless modem 51 and the wireless modem within the digital wireless infrastructure 140, a calling waveform 180 and a response waveform 190 may be transmitted. Both calling and response waveforms 180, 190 are signaling waveforms. Signaling waveforms are waveforms that alert the recipient wireless modem of a requested data communication; may comprise a single or plurality of audible tones; and are used to create a communication 'handshake' between two devices. Thus, these signaling waveforms are used to establish a data connection between modems 53 and 83, but are not used to send the data itself, which is instead modulated and sent separately after the data connection is established. The calling waveform is the signaling waveform of the sender/calling party. And the response waveform is the signaling waveform of the recipient/responding party.

To successfully transmit the signaling waveforms across the voice channel, the tone or tones of the signaling waveform are generated such that they vary in amplitude, frequency, phase, or any combination thereof. However, in the illustrated embodiment, signaling waveforms 180 and 190, while having characteristics that vary in any of the ways noted above, do not include periodic nullities. A nullity is an interval within the waveform which has zero amplitude for more than an instant (i.e., in a coordinate x-y plane, a nullity would be a piecewise interval of the waveform (a piecewise function) wherein for that piecewise interval y=0). Therefore, to further elaborate, a periodic nullity is a nullity that exhibits periodicity; i.e., the nullity occurs at regularly occurring intervals, despite what value the waveform is when it is not nullified (or at zero). Therefore, periodic nullities have substantially identical null or zero intervals and are repeated in a substantially cyclical manner. See, for example, the waveform $S_{OUT}(t)$ in FIG. 4 of U.S. Patent Application Publication No. 2005/0207511A1 which shows periodic nullities in the waveform.

Referring again to FIG. 2, the calling waveform 180 is a signaling waveform sent from the wireless modem 83 attempting to establish a data communication. In one embodiment, the calling waveform uses a single frequency of 2225 Hz. This frequency is phase shifted wherein one period of the waveform consists of phase shifting the 2225 Hz signal +90 degrees for 100 milliseconds (ms) followed by phase shifting the 2225 Hz signal −90 degrees for the next 100 ms. This alternating phase shift every 100 ms results generates an autocorrelation window (200 ms) with a distinct maximum amplitude and a distinct minimum amplitude. Other phase shifts, periods, and signal variations can be used. These distinctive features enable the system's echo canceller to distinguish the signal from its echo. Those skilled in the art will appreciate that autocorrelation is the cross-correlation of a signal with itself in order to observe similarities of the two signals as a function of the time separation between them. Here, an autocorrelation window of 500 ms (+/−250 ms) may still be effective in distinguishing the signal from its echo. However, signals with an autocorrelation window greater than 500 ms quickly become too flat either diminishing or terminating the effectiveness of the echo canceller's ability to distinguish the signal from its echo.

In FIG. 2, a response waveform 190 is a signaling waveform sent from the voice-band modem 53 within the vehicle 12 to the voice-band modem 83. In one embodiment, the response waveform is a single frequency of 1556 Hz and may have the same +90 degree periodic phase shifting discussed above in connection with the calling waveform 180.

Figure 3:
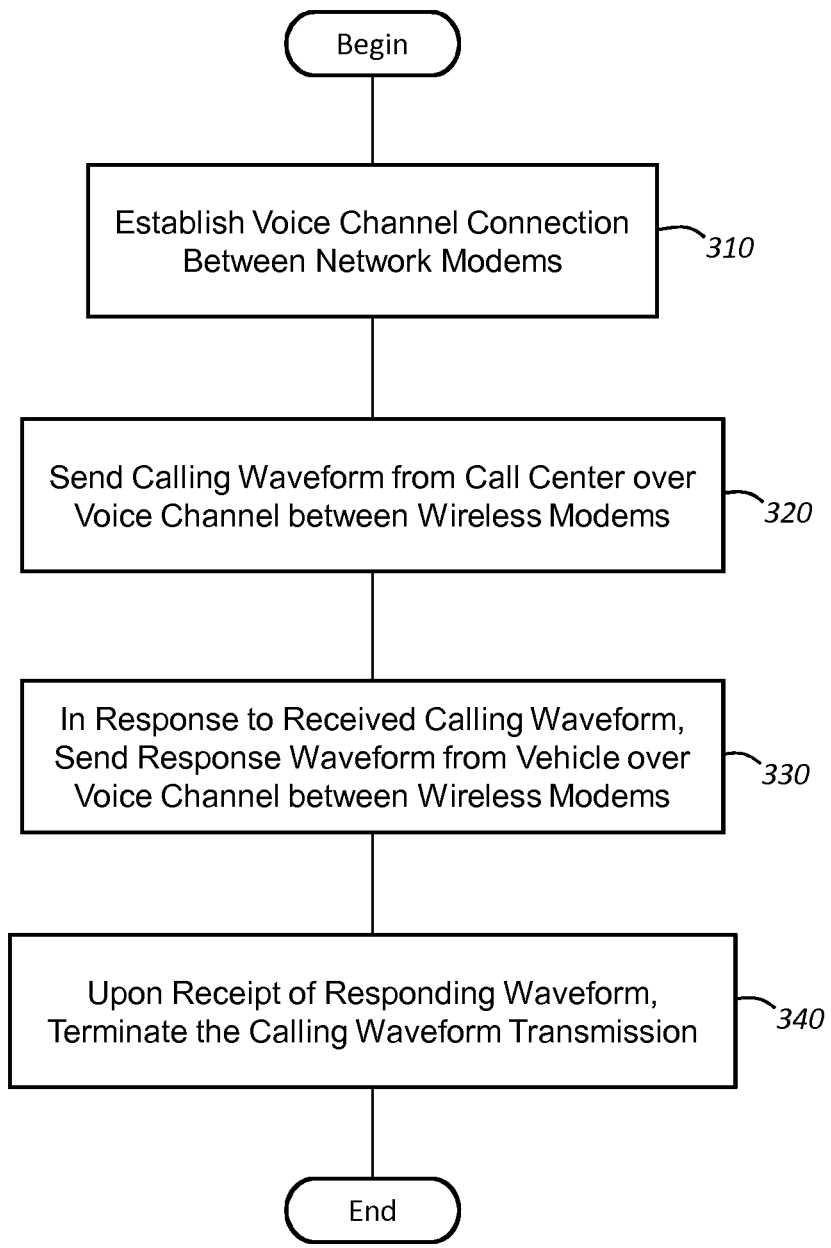
FIG. 3 is a flowchart depicting a process of establishing a data connection over a voice channel.

FIG. 3 provides a flowchart illustrating one exemplary embodiment of a data communication over a voice channel. A voice channel connection is first established between a network modem within the digital wireless infrastructure and a network modem within a vehicle 310. Then, a wireless modem at a call center sends a calling waveform over the voice channel to the wireless modem within the vehicle 320. When the calling waveform is received and recognized, the vehicle's wireless modem sends a response waveform over the voice channel to the wireless modem at the call center 330. Finally when the response waveform is received, the calling waveform transmission is terminated 340.

The successful exchange of these signaling waveforms is used to establish the data connection between the modems over the voice channel. Thereafter data communication between the modems 53, 83 can commence.

It is to be understood that the foregoing description is not a description of the invention itself, but one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a data connection over a voice channel via a cellular communication network, comprising the steps of:
    establishing a voice channel connection over a wireless carrier system; and
    creating a data connection over the established voice channel connection using the step of transmitting a signaling waveform over the voice channel between a first wireless modem at a vehicle and a second wireless modem remotely located from the vehicle, wherein the creating step includes, prior to transmitting the signaling waveform from the first wireless modem, generating the signaling waveform at the vehicle by:
        providing from an audio modem that is located in the vehicle a signal comprising one or more frequencies, wherein the signal varies in amplitude, frequency, phase, or any combination thereof without exhibiting periodic nullities;
        providing the signal as an input to a vocoder in the vehicle; and
        providing an output of the vocoder to the first wireless modem for transmission of the signaling waveform to the second wireless modem.

2. The method according to claim 1, wherein the vehicle comprises a telematics unit that comprises the first wireless modem.

3. The method according to claim 1, wherein the creating step further comprises transmitting the signaling waveform from the first wireless modem to the second wireless modem as a calling waveform.

4. The method according to claim 3, further comprising the step of receiving at the first wireless modem a response waveform sent by the second wireless modem.

5. The method according to claim 4, wherein the response waveform received by the first wireless modem is associated with a second signal generated at a data server that varies in amplitude, frequency, phase, or any combination thereof and does not exhibit periodic nullities, wherein the second signal is provided to another modem and vocoder located at the data server prior to being sent by the second wireless modem.

6. The method according to claim 4, further comprising the step of terminating the calling waveform in response to the receipt of the response waveform.

7. A method of establishing a data connection over a voice channel via a cellular communication network, comprising the steps of:
    establishing a voice channel connection over a wireless carrier system; and
    creating a data connection over the established voice channel connection using the step of transmitting a signaling waveform over the voice channel between a first wireless modem and a second wireless modem, wherein the signaling waveform varies in amplitude, frequency, phase, or any combination thereof without exhibiting periodic nullities,
    wherein the creating step further comprises transmitting the signaling waveform from the first wireless modem to the second wireless modem as a calling waveform,
    wherein the calling waveform has a frequency of 2225 Hz and wherein approximately every 100 milliseconds, the calling waveform includes phase shifts of the frequency that occur alternately and repetitively between a positive shift of 90 degrees and a negative shift of 90 degrees.

8. The method according to claim 1, further comprising:
    terminating the data connection and the voice channel connection between the first and second wireless modems;
    thereafter, establishing a second voice channel connection over the wireless carrier system; and
    creating a second data connection over the second voice channel connection, wherein the second wireless modem transmits a calling waveform to the first wireless modem and, based on the calling waveform, receives a response waveform, wherein the calling and response waveforms are associated with respectively different signals that vary in amplitude, frequency, phase, or any combination thereof without exhibiting periodic nullities.

9. The method according to claim 8, further comprising the step of terminating the calling waveform sent by the second wireless modem in response to the receipt of the response waveform from the first wireless modem.

10. A method of establishing a data connection over a voice channel via a cellular communication network, comprising the steps of:
    establishing a voice channel connection over a wireless carrier system; and
    creating a data connection over the established voice channel connection using the step of transmitting a signaling waveform over the voice channel between a first wireless modem and a second wireless modem, wherein the signaling waveform varies in amplitude, frequency, phase, or any combination thereof without exhibiting periodic nullities,
    wherein the creating step further comprises sending a calling waveform from the first wireless modem to the second wireless modem and, in response, sending the signaling waveform as a response waveform from the second wireless modem to the first wireless modem,
    wherein the response waveform is a single frequency of 1556 Hz and wherein approximately every 100 milliseconds, the response waveform includes phase shifts of the frequency that occur alternately and repetitively between a positive shift of 90 degrees and a negative shift of 90 degrees.

11. The method according to claim 1, wherein the establishing step further comprises establishing the voice channel connection over a wireless communication system using cellular network modems and wherein the signaling waveform is sent over the voice channel between the first and second modems via the network modems.

12. The method according to claim 1, wherein the step of providing a signal from an audio modem further comprises providing a signal having at least one frequency that includes phase shifts.

13. The method according to claim 1, wherein the signaling waveform includes random audio tones that do not exhibit periodic nullities and that lessen or avoid echo cancellation at the vocoder.

* * * * *